(12) United States Patent
Minoo et al.

(10) Patent No.: US 10,412,208 B1
(45) Date of Patent: Sep. 10, 2019

(54) NOTIFICATION SYSTEMS FOR SMART BAND AND METHODS OF OPERATION

(71) Applicant: Apple Inc., Cupertino, CA (US)

(72) Inventors: Jahan Christian Minoo, Cupertino, CA (US); Scott Krueger, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/291,033

(22) Filed: May 30, 2014

(51) Int. Cl.
*H04M 1/00* (2006.01)
*H04M 1/725* (2006.01)

(52) U.S. Cl.
CPC ................................ *H04M 1/7253* (2013.01)

(58) Field of Classification Search
CPC .. G08B 7/06; G08B 17/10; G08B 6/00; A44C 5/0007; G04G 13/02; G04G 21/00; G09B 21/009; H04M 19/047; H04M 1/7253; H04M 1/72522; H04M 1/72527; H04M 2250/52; H04N 2007/145
USPC .............. 455/556.1, 56.15; 340/539.11, 628; 368/230
See application file for complete search history.

(56) References Cited

U.S. PATENT DOCUMENTS

| | | | |
|---|---|---|---|
| 3,973,706 A | 8/1976 | Boyce et al. | |
| 5,361,241 A | 11/1994 | Ferrara et al. | |
| 5,872,744 A | 2/1999 | Taylor | |
| 6,619,835 B2 | 9/2003 | Kita | |
| 7,130,664 B1 * | 10/2006 | Williams | 455/567 |
| 7,463,205 B2 | 12/2008 | Turner et al. | |
| 7,618,260 B2 | 11/2009 | Daniel et al. | |
| 7,808,368 B2 * | 10/2010 | Ebrom | H04L 12/2823 340/286.11 |
| 8,098,141 B2 | 1/2012 | Vanska et al. | |
| 8,345,414 B2 | 1/2013 | Mooring et al. | |
| 8,467,270 B2 | 6/2013 | Gossweiler, III et al. | |
| 8,712,383 B1 * | 4/2014 | Hayes et al. | 455/412.2 |
| 8,851,372 B2 | 10/2014 | Zhou et al. | |
| 8,885,815 B1 * | 11/2014 | Velusamy | H04R 3/02 379/406.03 |

(Continued)

FOREIGN PATENT DOCUMENTS

| | | | |
|---|---|---|---|
| DE | 3813409 | 11/1989 | |
| WO | WO2014/134497 | 9/2014 | |
| WO | WO2015183178 | * 5/2015 | ............ H04W 88/02 |

OTHER PUBLICATIONS

Author Unknown, "Build the Smartwatch of Your Dreams with this Modular Wearable," http://www.dvice.com/2014-3-7/build-smartwatch-your-dreams-modular-wearable, 2 pages, at least as early as Jul. 23, 2014.

*Primary Examiner* — Khoi H Tran
*Assistant Examiner* — B M M Hannan
(74) *Attorney, Agent, or Firm* — Morgan, Lewis & Bockius LLP (57) ABSTRACT

Embodiments relate generally to mobile devices and more particular to notification accessories capable of displaying alerts generated by mobile devices. In one embodiment, a notification accessory in the form of a wristband is disclosed. The notification accessory can receive notifications wirelessly from a mobile device and display the notifications to a user. Icons illuminating in different colors and haptics can be used to alert the user to the presence of the notification. In other embodiments, the notification accessory can also be used to send commands back to the mobile device.

17 Claims, 10 Drawing Sheets

(56) References Cited

U.S. PATENT DOCUMENTS

| | | | |
|---|---|---|---|
| 9,016,565 B2 | 4/2015 | Zhou et al. | |
| 9,141,086 B1 | 9/2015 | Rohrbach | |
| 2004/0224223 A1 | 11/2004 | Sun et al. | |
| 2005/0014534 A1* | 1/2005 | Hareng | H04M 1/575 455/567 |
| 2005/0094795 A1* | 5/2005 | Rambo | 379/202.01 |
| 2007/0230712 A1* | 10/2007 | Belt et al. | 381/71.1 |
| 2010/0081487 A1* | 4/2010 | Chen | G10L 21/0208 455/575.1 |
| 2010/0266139 A1* | 10/2010 | Yuzuriha | H04M 3/565 381/80 |
| 2010/0273530 A1* | 10/2010 | Jarvis | F16F 1/027 455/566 |
| 2010/0321899 A1 | 12/2010 | Vossoughi et al. | |
| 2011/0018731 A1* | 1/2011 | Linsky et al. | 340/825.36 |
| 2011/0080348 A1* | 4/2011 | Lin | G06F 1/1626 345/173 |
| 2011/0280042 A1* | 11/2011 | Pance et al. | 362/606 |
| 2012/0108215 A1* | 5/2012 | Kameli | 455/412.2 |
| 2012/0114138 A1* | 5/2012 | Hyun | H04R 3/005 381/92 |
| 2012/0262536 A1* | 10/2012 | Chen | H04R 1/406 348/14.08 |
| 2013/0135213 A1* | 5/2013 | Pance | G06F 3/044 345/169 |
| 2013/0154826 A1* | 6/2013 | Ratajczyk | 340/539.11 |
| 2013/0225915 A1* | 8/2013 | Redfield et al. | 600/28 |
| 2013/0262298 A1* | 10/2013 | Morley | 705/39 |
| 2013/0328914 A1* | 12/2013 | Smith | G06F 3/01 345/619 |
| 2014/0119568 A1* | 5/2014 | Yu | H04R 3/005 381/92 |
| 2014/0177869 A1* | 6/2014 | Percy | H04R 3/005 381/97 |
| 2014/0180582 A1* | 6/2014 | Pontarelli et al. | 701/494 |
| 2014/0313040 A1* | 10/2014 | Wright, Sr. | 340/628 |
| 2014/0344375 A1* | 11/2014 | Hauser | H04L 51/04 709/206 |
| 2015/0065055 A1* | 3/2015 | Newham | H04W 4/008 455/41.3 |
| 2015/0155730 A1* | 6/2015 | Miller et al. | 320/140 |
| 2015/0155903 A1* | 6/2015 | Jang | H04B 1/3888 455/575.8 |
| 2015/0163339 A1* | 6/2015 | Fenton | H04M 19/04 455/557 |
| 2015/0186092 A1* | 7/2015 | Francis | G06F 3/1423 345/520 |
| 2016/0094259 A1 | 3/2016 | Hatanaka et al. | |
| 2016/0119463 A1* | 4/2016 | Tan | H04M 1/7253 455/556.1 |

* cited by examiner

NOTIFICATION SYSTEMS FOR SMART BAND AND METHODS OF OPERATION

FIELD OF THE INVENTION

The described embodiments relate generally to mobile devices and more particular to notification accessories capable of displaying alerts generated by mobile devices.

BACKGROUND

Mobile devices can generate notifications to alert a user of the device to incoming phone calls, messages, emails, calendar appointments, updates, and the like. These notifications are typically displayed on a screen of the device and can be accompanied by an auditory alert or haptic. There are several disadvantages to these methods of notification. First, determining the source of the notification can require the user to retrieve and in some cases unlock the device. Second, if the user is in a loud or crowded environment, the notification may not be recognizable over background noise. Finally, if the mobile device is kept in a purse or bag not directly in contact with the user, haptic notifications may go unnoticed.

Therefore, what is desired is a notification accessory capable of receiving notifications from the mobile device and alerting the user to the presence and type of notification.

SUMMARY

Several embodiments of a notification accessory capable of relaying notifications from a mobile device to a user are described. In one embodiment, the notification accessory includes a housing configured to secure the notification accessory to a user. A wireless communication circuit is located within the housing and is configured to wirelessly receive information from a mobile device. Furthermore, an alerting mechanism is included in the housing. The alerting mechanism alerts the user when the wireless communication circuit receives a notification from the mobile device. The alerting mechanism can also provide the user with information related to the type and source of the notification.

In another embodiment, a system for receiving notifications from a mobile device and sending commands to the mobile device is described. One embodiment of the system includes the following components: (1) a wristband configured to be worn around a user's wrist, (2) a display located on an external surface of the wristband, and (3) a user input mechanism also disposed on the external surface of the wristband. Certain embodiments may likewise include or incorporate a processor (which may be housed within the wristband) and a wireless transmitter or transceiver. The display is configured to show notifications received from the mobile device and the user input mechanism is configured to allow the user to control certain aspects of the mobile device.

In yet another embodiment, a non-transient computer readable medium for storing computer code executable by a processor in a notification accessory is described. The non-transient computer readable medium includes at least the following: (1) computer code for wirelessly receiving a notification from a mobile device, (2) computer code for displaying information contained in the notification to the user, (3) computer code for receiving user inputs into the notification accessory, and (4) computer code for wirelessly transmitting user inputs from the notification accessory to the mobile device.

Other aspects and advantages of the invention will become apparent from the following detailed description taken in conjunction with the accompanying drawings which illustrate, by way of example, the principles of the described embodiments.

In still another embodiment, a method for receiving a notification from a mobile device and displaying the notification to a user is described. The method includes at least the following steps: (1) wirelessly receiving the notification from the mobile device, (2) visually displaying information describing the notification to the user, (3) providing a haptic sufficient to alert the user that the notification is received, (4) receiving user input regarding actions to take in response to the notification, and (5) wirelessly transmitting the user input to the mobile device.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

DETAILED DESCRIPTION

Representative methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, certain embodiments. Although these embodiments are described in sufficient detail to enable one skilled in the art to practice the described embodiments, it is understood that these examples are not limiting; other embodiments may be used, and changes to illustrated or described embodiments may be made without departing from the spirit and scope of the described embodiments.

Several embodiments of a notification accessory capable of relaying notifications from a mobile device to a user are described. In one embodiment, the notification accessory can take the form of a wristband, lanyard, loop or other attachment. The notification accessory can include or generate a variety of icons corresponding to different types of notifications such as text messages, email, incoming phone calls, and calendar appointments. When the notification accessory receives a signal from the mobile device, the icon corresponding to the notification can illuminate. In addition, the wristband can include a vibrator to alert the user to the presence of the notification. In another embodiment, the wristband can include a display with interactive touch-, force-, or pressure-sensitive, controls capable of sending commands to the mobile device. For example, touch inputs can direct the mobile device to accept or reject incoming calls, send predefined text messages, adjust volume levels, and control a variety of other functions of the mobile device. In addition to touch inputs, some embodiments can include one or more microphones for allowing voice control of the mobile device. In some embodiments, the wristband can include a clasp consisting of male and female connectors capable of charging the notification accessory. Furthermore, the notification accessory can be connected in series with the mobile device to allow charging of both the notification accessory and the mobile device simultaneously. In still other embodiments, the notification accessory can take forms other than a wristband, including necklaces, earrings, pins, and other forms.

Figure 1:
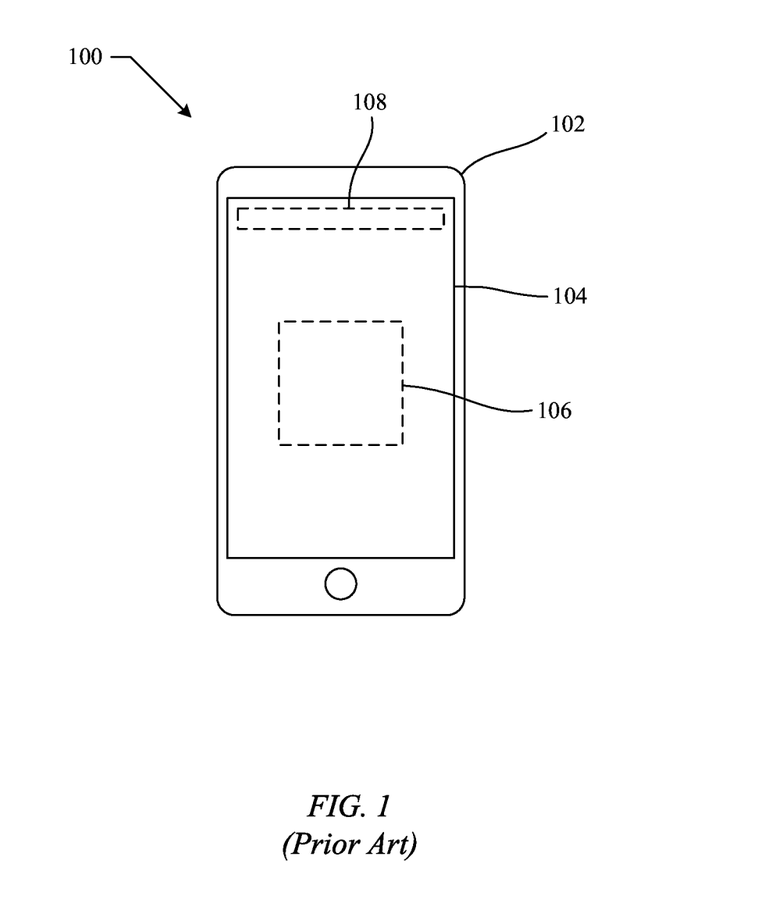
FIG. 1 shows a prior art mobile device and notification system.

FIG. 1 shows a prior art mobile device 100 with on-screen notifications. Mobile device 100 can include housing 102 and display 104. Mobile device 100 typically delivers notifications of incoming messages, calls, and other important information by creating dialogue box 106 or displaying the notification in banner 108. In addition, mobile device 100 can create auditory alerts and haptics to alert the user to the presence of the notification. However, there are several disadvantages to this notification system. First, when the user is actively using mobile device 100, the appearance of dialogue box 106 can interrupt any tasks that the user is performing. Second, when mobile device 100 is not being used, determining the nature of a notification can require retrieving and unlocking mobile device 100. Finally, notifications can be easily missed if mobile device 100 is stored away from the user's body such as in a purse. Alternative mobile devices include tablet computing devices, media players, health monitoring devices, and so on.

Figure 2:
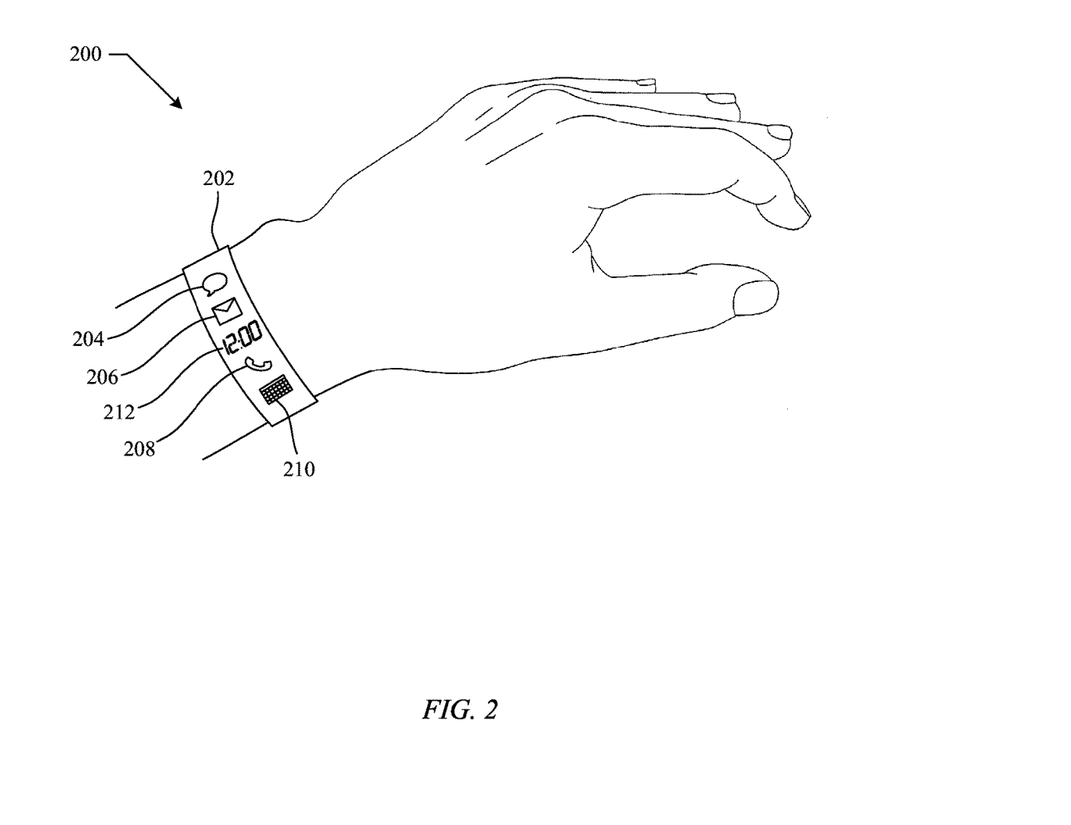
FIG. 2 shows a notification accessory in the form of a wrist band.

FIG. 2 shows notification accessory 200, which may operate with or in place of mobile device 100. In one embodiment, notification accessory 200 can take the form of wristband 202. Wristband 202 can be formed from a variety of materials including metals, plastics, polymers, rubber, leather, fabrics or any other sufficiently robust material. Certain embodiments of the notification accessory 200 may flex at any or all regions along its length.

In one embodiment, a number of notification icons can be positioned along wristband 202. For example, icon 204 can represent incoming text messages, icon 206 can represent incoming email, icon 208 can represent incoming phone calls, and icon 210 can represent calendar notifications. In other embodiments, more or fewer icons than those depicted in FIG. 2 can be included to represent other types of notifications. Additionally, icons can be spaced around wristband 202 as shown or can be combined in one area of wristband 202 so that only one icon is illuminated at any given time. Alternative embodiments may be capable of illuminating multiple icons simultaneously, for example through simultaneous operation of multiple light sources, each of which is associated with a different icon. In some embodiments, notification accessory 202 can also include clock 212 to display the time.

Figure 6A:
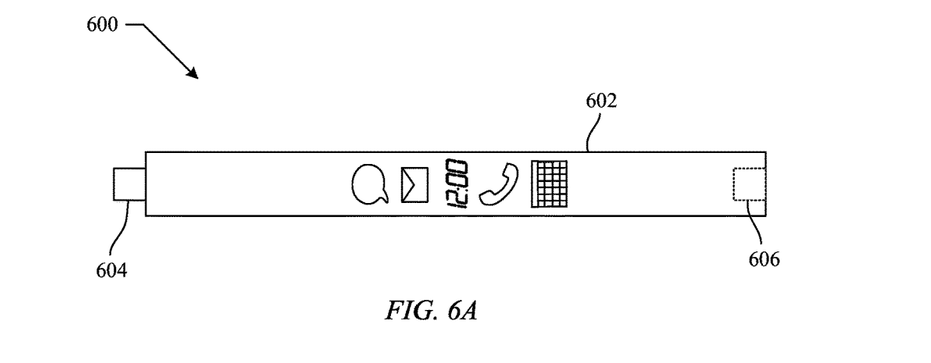
FIG. 6A shows a notification accessory with a charging connector integrated into a clasp.
Figure 6B:
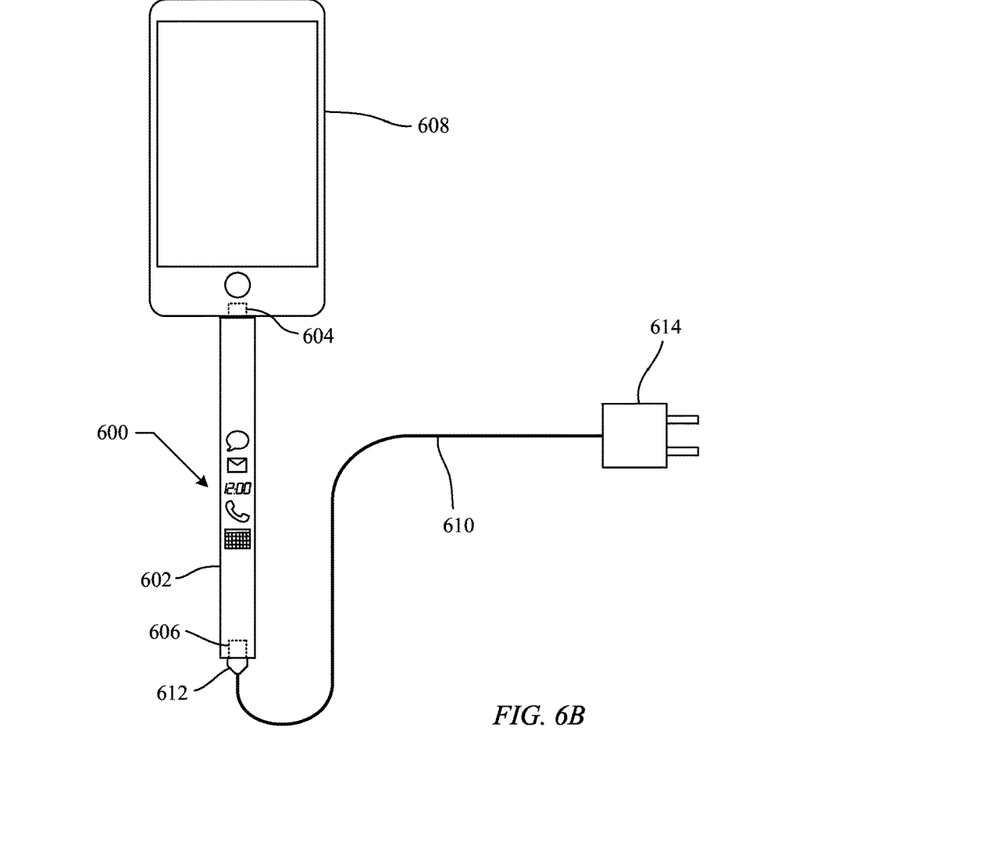
FIG. 6B shows a notification accessory and a mobile device being charged in series.

Notification accessory 200 can wirelessly receive notifications from one or more mobile devices either wirelessly or through a physical connection. For example, notification device 200 can receive signals from a mobile phone, tablet computer, personal digital assistant (PDA), or any other device capable of generating notifications. Signals can be transmitted wirelessly using a variety of communications standards including Bluetooth, WiFi, and any other technically feasible means of transmitting a signal. One example of a wired connection capable of providing notifications to accessory 200 is shown in FIGS. 6A & 6B. As illustrated, the accessory 200 may physically mate with the mobile device 100 to receive signals therefrom, as well as charge the accessory and/or device.

When notification accessory 200 receives a notification signal from the mobile device, the icon corresponding to the type of notification can illuminate. For example, if a new email is received, icon 206 can illuminate on wristband 202. In some embodiments, notification accessory 200 can display a notification for a pre-defined period of time. In other embodiments, notification accessory 200 can include a button or other form of input that can clear any notifications when pressed by the user.

Additional features can be included or incorporated in notification accessory 200 to allow the user to distinguish between different types of notifications. In some embodiments, icons 204, 206, 208, and 210 can illuminate in different colors depending on the source of the notification. For example, icon 204 can illuminate in a first color when text messages are received from a list of "VIP" contacts and can illuminate in a second color for all other contacts. In other embodiments, more than two colors can be used for each icon. For example, a contact list can be divided into categories such as "Friends," "Family," "Work Contacts," and "Others." Each group can be assigned a different color so that the user can discern which group an incoming text message, email, or phone call originated from without looking at the mobile device.

In addition to visual notifications, notification accessory 200 can also include a haptic device in wristband 202 for alerting the user when a notification is received. In some embodiments, a single haptic sequence can be used each time a notification is received. In other embodiments, the haptic device can create different patterns for different types of notifications. For example, a single haptic pulse can notify the user of an incoming email, a double haptic pulse can notify the user of an incoming text message, and so on. In some embodiments, both the color coding and haptic patterns for various types of notifications can be set by the user through the mobile device. In other embodiments, such settings may be controlled directly through interaction with notification accessory 200. In still another embodiment, settings can be controlled by syncing notification accessory 200 with a computer or other device, such as a mobile device 100.

Figure 3A:
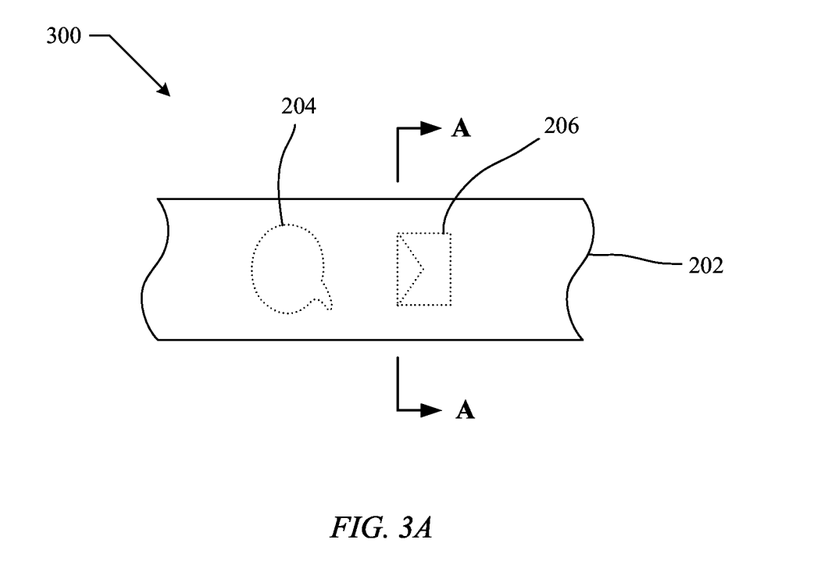
FIG. 3A shows a plan view of a portion of a notification accessory having micro-perforations arranged in the shape of icons.
Figure 3B:
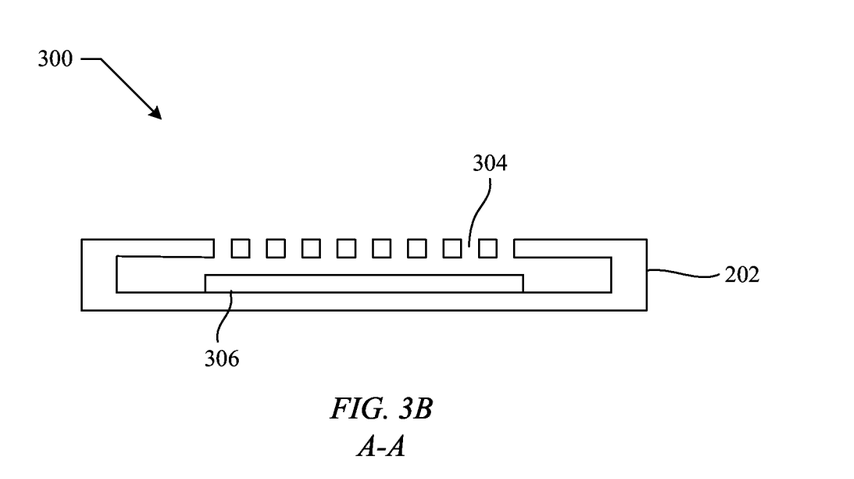
FIG. 3B shows an instantaneous cross-sectional view of a notification accessory utilizing micro-perforations arranged in the shape of icons, taken along line A-A of FIG. 3A.

FIGS. 3A and 3B show notification accessory 300, demonstrating a method of illuminating various icons on the notification accessory. FIG. 3A shows a plan view of a portion of notification accessory 300 including icons 204 and 206. The outlines of icons 204 and 206 can be formed from a number of micro-perforations in an upper surface of wristband 202. FIG. 3B shows cross-sectional view A-A. Micro-perforations 304 can be included in the upper surface of wristband 202 as shown. Furthermore, illumination source 306 can be placed on the interior of wristband 202 and positioned below micro-perforations 304. When a notification is received, illumination source 306 can generate light that passes through micro-perforations 304 and illuminates the corresponding icon on notification accessory 300. Illumination source 306 can represent one or more LEDs, a luminescent strip, or any other technically feasible means for generating light. As was mentioned above, in some embodiments illumination source 306 can generate light in different colors depending on the type or source of the notification. In another embodiment, the upper surface of wristband 202 can include a dot matrix of LED lights or fiber-optics ("pixel matrixes") capable of displaying icons and text corresponding to various notifications. Generally, it should be appreciated that the icons may move and flex as the notification accessory 300 flexes, insofar as the icons are formed on or in the accessory's flexible housing.

Figure 4A:
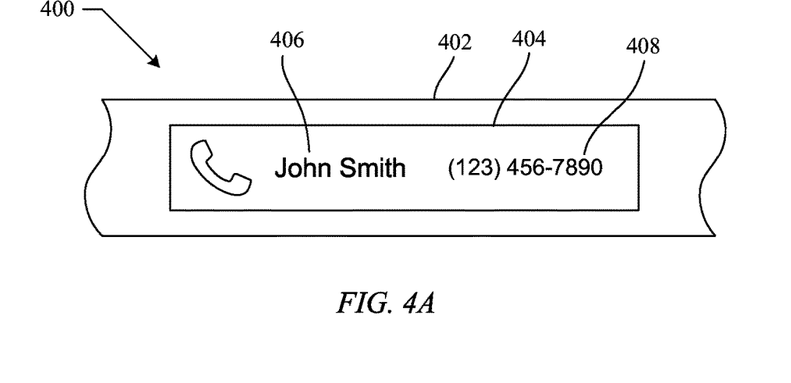
FIG. 4A shows a notification accessory displaying an incoming call alert.
Figure 4B:
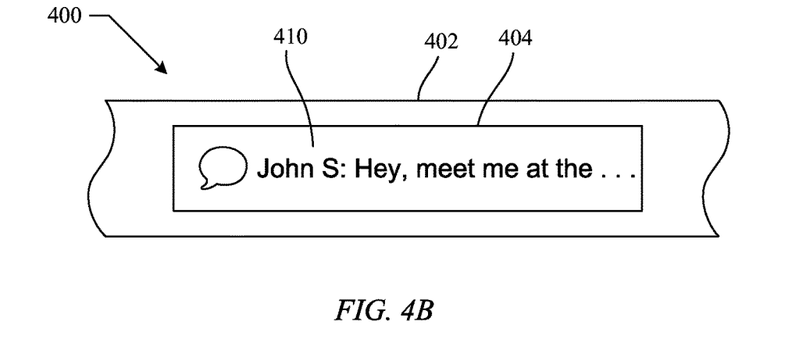
FIG. 4B shows a notification accessory displaying an incoming message alert.
Figure 4C:
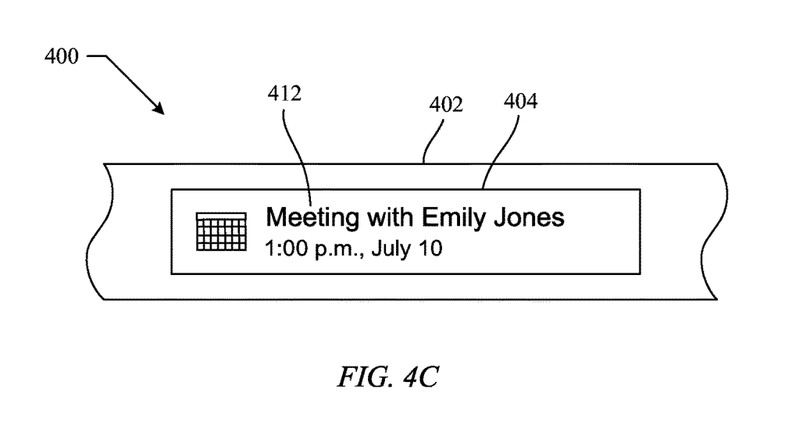
FIG. 4C shows a notification accessory displaying a calendar notification.

FIGS. 4A-4C show notification accessory 400, demonstrating an embodiment with an integrated display. Wristband 402 can include display 404 mounted along an outer surface. Display 404 can represent a liquid crystal display (LCD), bi-stable LCD, organic light-emitting diode (OLED) cell, active-matrix organic light-emitting diode (AMOLED) cell, e-ink display, or any other technically feasible display. Notifications from the mobile device can be shown on display 404 when received by notification accessory 400. For example, FIG. 4A shows a notification for an incoming phone call. In addition to notifying the user that there is an incoming phone call, display 404 can provide a name 406 and phone number 408 associated with the contact from whom the incoming call originates.

Similarly, FIG. 4B shows a notification for an incoming text message. Display 404 can show the user the source of the text message and, in some embodiments, can also display some or all of the contents of the text message. In some embodiments, text 410 can scroll across display 404, allowing the user to view an entire text message without accessing the mobile device. Incoming emails and other messages can be handled similar to the text message illustrated in FIG. 4B. FIG. 4C shows an example of a notification for an upcoming calendar appointment. Notification accessory 400 can be configured to provide information relating to the subject, time, and place of the meeting through text 412.

In addition to the notifications illustrated in FIGS. 4A-4C, display 404 can provide the user with any other type of notification that can be generated by the mobile device. In addition, settings controlling the manner in which the notifications are displayed can be controlled from the mobile device. In some embodiments, notification accessory 400 can also include a haptic device similar to notification accessory 200 for alerting the user of incoming notifications. Different lengths and patterns of haptic outputs can be used to represent different types of notifications.

Figure 5A:
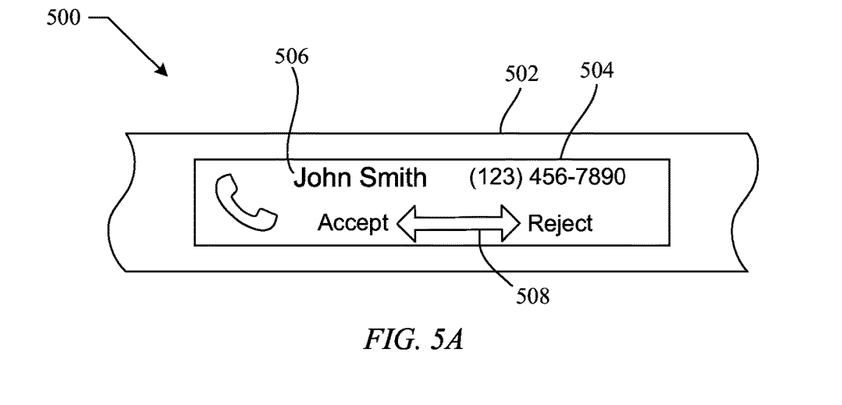
FIG. 5A shows a notification accessory that accepts a user input for accepting or rejecting an incoming call.
Figure 5B:
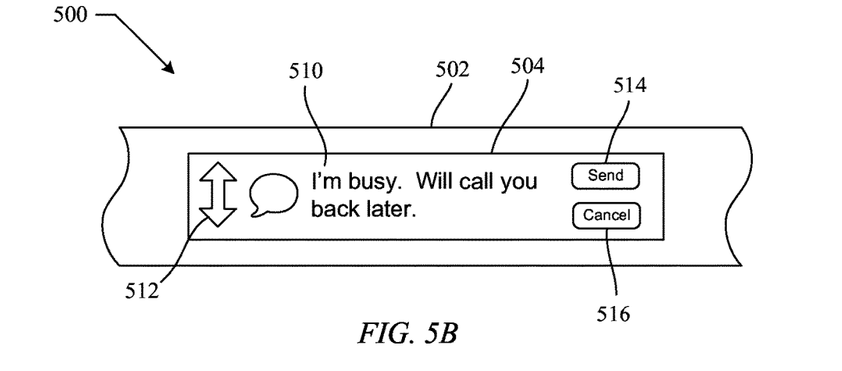
FIG. 5B shows a notification accessory that accepts a user input for sending a predefined message in response to a rejected call.
Figure 5C:
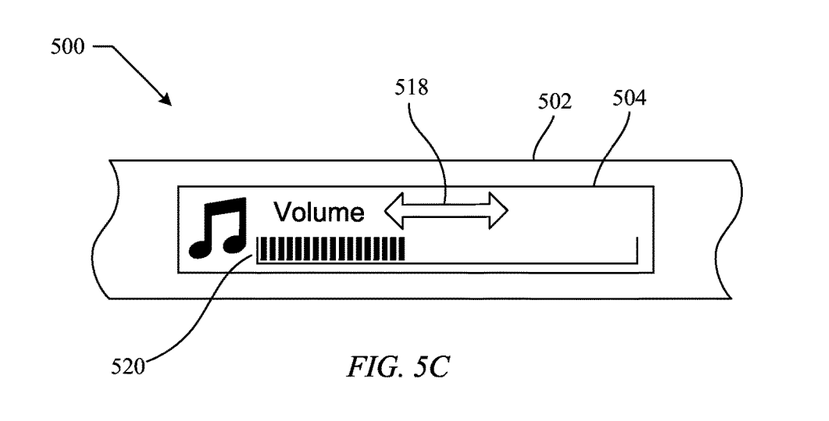
FIG. 5C shows a notification accessory that accepts a user input for controlling a volume level.

FIGS. 5A-5C show notification accessory 500, demonstrating an embodiment including an integrated display and a touch screen. Wristband 502 can include display 504 mounted along an outer surface. Similar to notification accessory 400, display 504 can represent an LCD, OLED, AMOLED, e-ink, pixel matrix or other display. In addition, display 504 can include a touch sensitive layer that allows the user to input commands. Rather than contain only a wireless receiver, notification accessory 500 can include both a wireless receiver and transmitter, allowing the user to command and control certain features of the mobile device through notification accessory 500.

For example, FIG. 5A demonstrates how notification accessory 500 can display an incoming call. Text 506 can display information relevant to the contact that the incoming call originated from. In addition, display 504 can allow the user to control the mobile device by selecting whether to accept or decline the incoming call. In one embodiment, the user can control the mobile device by swiping a finger across display 504 in direction 508. In other embodiments, similar commands can be given by tapping certain parts of the screen. In still other embodiments, physical buttons or switches can be provided on wristband 502 or below the section and/or icons, such as within the wristband, instead of a touch screen and can be used to control the mobile device.

Other commands can be transmitted to the mobile device through notification accessory 500. For example, FIG. 5B shows a menu of preset responses that can be sent after an incoming call is declined. The user can program a number of responses using the mobile device and store them for use when a message is received or incoming call is declined. In some embodiments, a screen similar to that in FIG. 5B can appear whenever a call is declined. The user can scroll through possible responses by swiping up and down on display 504 in direction 512, or through any other feasible means of inputting commands. A reply message can be sent by tapping area 514 or the message can be cancelled by tapping area 516.

In some embodiments, notification accessory 500 can be used to control media on the mobile device as well. For example, FIG. 5C shows notification device 500 controlling a volume level for the mobile device. Meter 520 can display the current volume level and the user can control the volume by swiping along direction 518 or any other means of inputting commands. In one embodiment, the volume level can be adjusted by grasping and rotating wristband 502.

Certain embodiments may employ a sensor, such as an accelerometer, gyroscope, or other suitable motion or position sensor, to determine or detect motion of the wristband 502. A wristband 502 (or other accessory 200) outfitted with such a sensor may permit gestural control of the wristband, so that hand or arm gestures may be used instead of physical contact with the wristband to provide user input or otherwise activate functionality. Further, positional sensing may be used to adjust or modify the orientation and/or position of icons or information on the display.

FIG. 6A shows notification accessory 600, demonstrating one method by which notification accessory 600 can be attached to the user's wrist. A variety of attachment means can be used to fasten wristband 602. In some embodiments, buckles, clasps, hook and loop straps, magnets, and the like can be used to fasten free ends of wristband 602. In some of these embodiments, the fastening means can be adjustable so that wristband 602 can fit a variety of wrist sizes. In other embodiments, a variety of sizes of wristband 602 can be used to accommodate different wrist sizes. In one embodiment, wristband 602 can be fastened by inserting connector 604 into connector receptacle 606. Connector 604 can represent a variety of connectors including USB, micro USB, Lightning connectors, and the like. Connector receptacle 606 can be configured to mate with connector 604 so that wristband 602 can be closed by inserting connector 604 into connector receptacle 606. In some embodiments, connector receptacle 606 can connect to a charging cord for providing power to a battery contained within notification accessory 600. In other embodiments, connector receptacle 606 can be used to transfer data to notification accessory 600 as well.

FIG. 6B shows notification accessory 600, mobile device 608, and charging cable 610. Connector 604 can be configured to interface with a connector receptacle in mobile device 608 in addition to connector receptacle 606. Notification accessory 600 can be connected in series with charging cable 610 and mobile device 608. Charging cable 610 can be connected to a wall outlet or other power source that allows batteries in both notification accessory 600 and mobile device 608 to be charged simultaneously. In some embodiments, charging cable 610 can be connected to a computing device instead of a power source and data can be transferred between the computing device, mobile device 608, and notification accessory 600. It should be appreciated that certain embodiments may charge without requiring connection to any mobile device.

Figure 7:
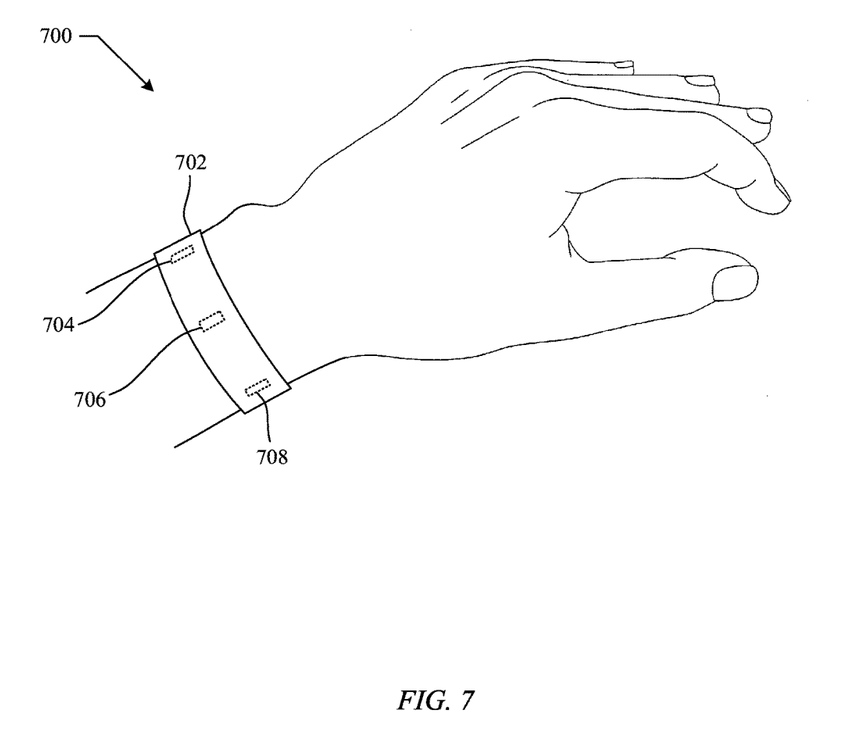
FIG. 7 shows a notification accessory with integrated microphones.

FIG. 7 shows notification accessory 700. Notification accessory 700 can allow the user to control the mobile device using voice commands. In one embodiment, a single microphone 704 can be included in notification accessory 700. The microphone can record or accept voice inputs from the user and transmit the voice inputs to the mobile device. In some embodiments, a button or other input method can be positioned on the exterior of notification accessory 700 and the user can indicate the beginning of a voice input by depressing the button. In other embodiments, the user can indicate the desire to enter a voice input by speaking a keyword or phrase into microphone 704.

In still other embodiments, two or more microphones can be provided at intervals along notification accessory 700. For example, microphones 704, 706, and 708 are spaced evenly around wristband 702 in notification accessory 700. Microphones 704, 706, and 708 can be connected to a processor within notification accessory 700 or the mobile device capable of performing beam-forming analysis. Sound recorded by each microphone can be analyzed to determine which microphone is pointed most directly towards the user's voice. Then, the processor can focus on sounds from the microphone nearest the user's voice when performing voice analysis. This may reduce the amount of ambient noise and room echo in the audio signal, resulting in more accurate voice analysis.

Figure 8:
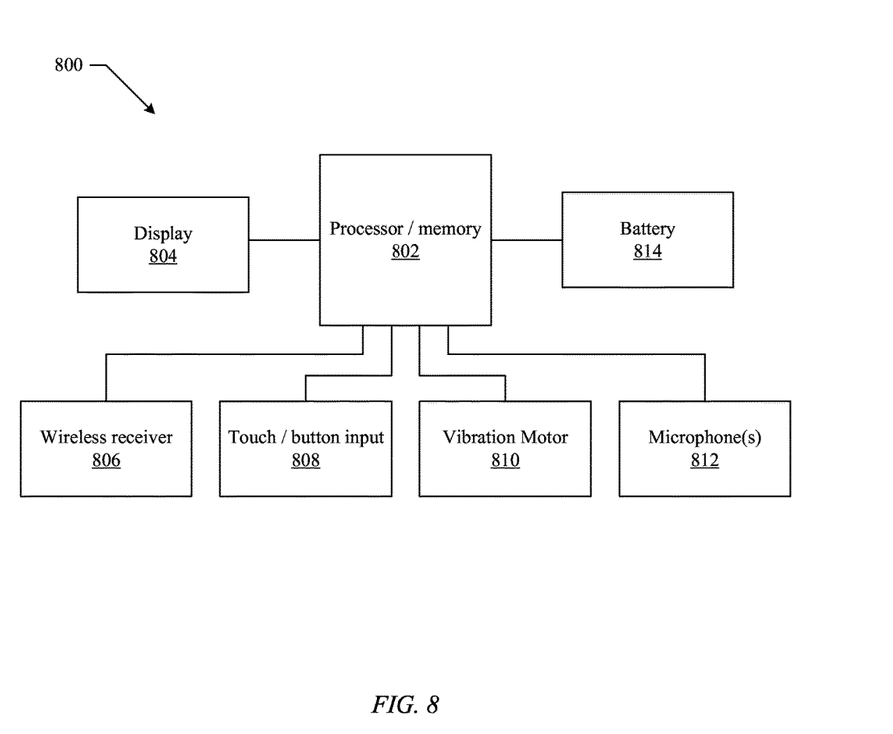
FIG. 8 shows a block diagram of sample internal components of a notification accessory.

FIG. 8 shows system 800 capable of implementing a notification accessory such as those described in FIGS. 2-7. System 800 can include processor and memory unit 802. The processor can execute commands within system 800 and the memory can store an operating system and routines for controlling and operating various components within system 800. Processor 802 can send signals to display 804 for relaying notifications to the user. In one embodiment, display 804 can include a series of icons that can be illuminated in various colors. In other embodiments, display 804 can include an LCD, OLED, AMOLED, e-ink, or other similar display. Processor 802 can also send and receive signals from wireless receiver 806. Wireless receiver 806 can receive signals using a variety of communications standards including Bluetooth, WiFi, and any other technically feasible means of transmitting a signal. In some embodiments, wireless receiver 806 can only receive signals from the mobile device. In other embodiments, wireless receiver 806 can also transmit command and control signals to the mobile device, allowing the user to control the mobile device through the notification accessory.

In embodiments where command and control of the mobile device through system 800 is available, processor 802 can receive signals from user input 808. In some embodiments, user input 808 can represent a touch screen overlaid over display 804. In other embodiments, input 808 can consist of buttons or other physical input methods arranged within system 800. Processor 802 can also send signals to haptic device 810. In some embodiments, processor 802 can cause haptic device 810 to vibrate in different patterns depending on the type and source of an incoming notification. In addition, processor 802 can receive signals from one or more microphones 812 and relay a corresponding voice signal to the mobile device through wireless receiver/transmitter 806. In some embodiments, one microphone can be used. In other embodiments, multiple microphones can be used and processor 802 or the mobile device can perform beam-forming analysis on the incoming signals to remove ambient noises and echoes from the signal. Finally, processor 802 and other components within system 800 can receive power from battery 814. Battery 814 can include a lithium ion, lithium polymer, or any other suitable battery. In some embodiments, battery 814 can be recharged by connecting a power source to a connector receptacle coupled to system 800.

Figure 9A:
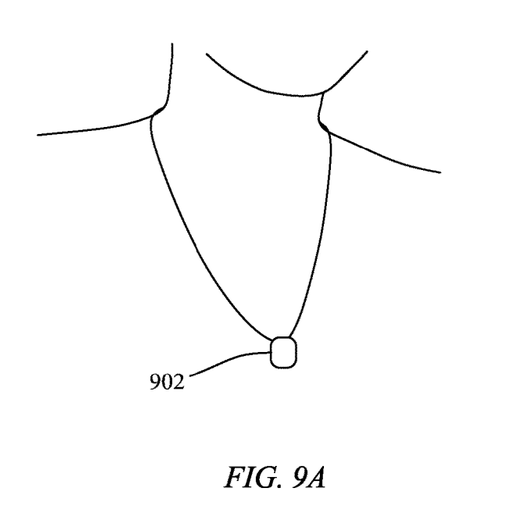
FIG. 9A shows a notification accessory worn as a necklace.
Figure 9B:
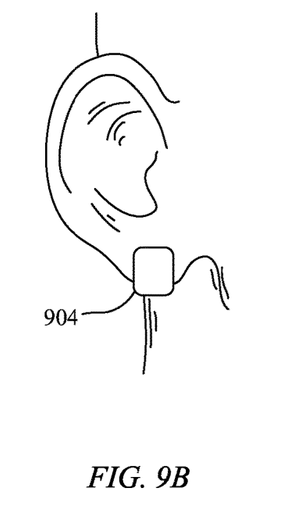
FIG. 9B shows a notification accessory worn as an earring.
Figure 9C:
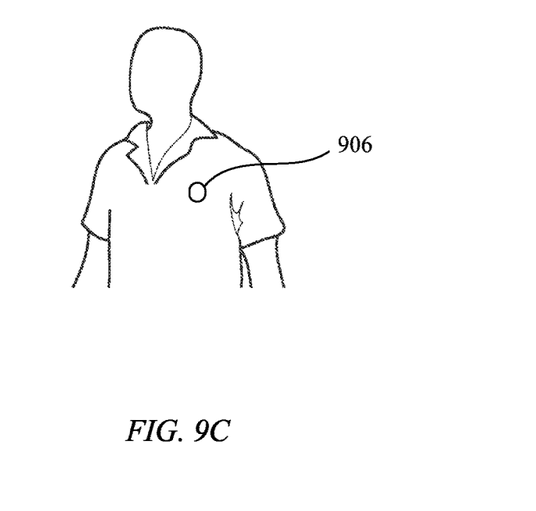
FIG. 9C shows a notification accessory worn as a pin.

FIGS. 9A-9C show other embodiments of notification accessories. The embodiments described above generally related to a notification accessory in the form of a wristband. However, the concepts and systems described can be included in any number of forms and accessories. For example, FIG. 9A shows notification accessory 902 in the shape of a necklace. Notification accessory 902 can receive notifications from a mobile device wirelessly and can alert the user of these notifications using haptics, light, a display, or any combination of these. Similarly, FIG. 9B shows notification accessory 904 in the form of an earring. Notification accessory 904 can also receive wireless notifications from the mobile device and can alert the user through haptics. Finally, FIG. 9C shows notification accessory 906 in the form of a pin or brooch. Notification accessory 906 can include a pin or clip allowing the accessory to be attached to clothing, a purse, or any other surface and provide notifications to the user similar to notification accessories 902 and 904. In addition to those forms shown in FIGS. 9A-9C, notification capabilities can be incorporated into any other feasible accessory or clothing item.

Figure 10:
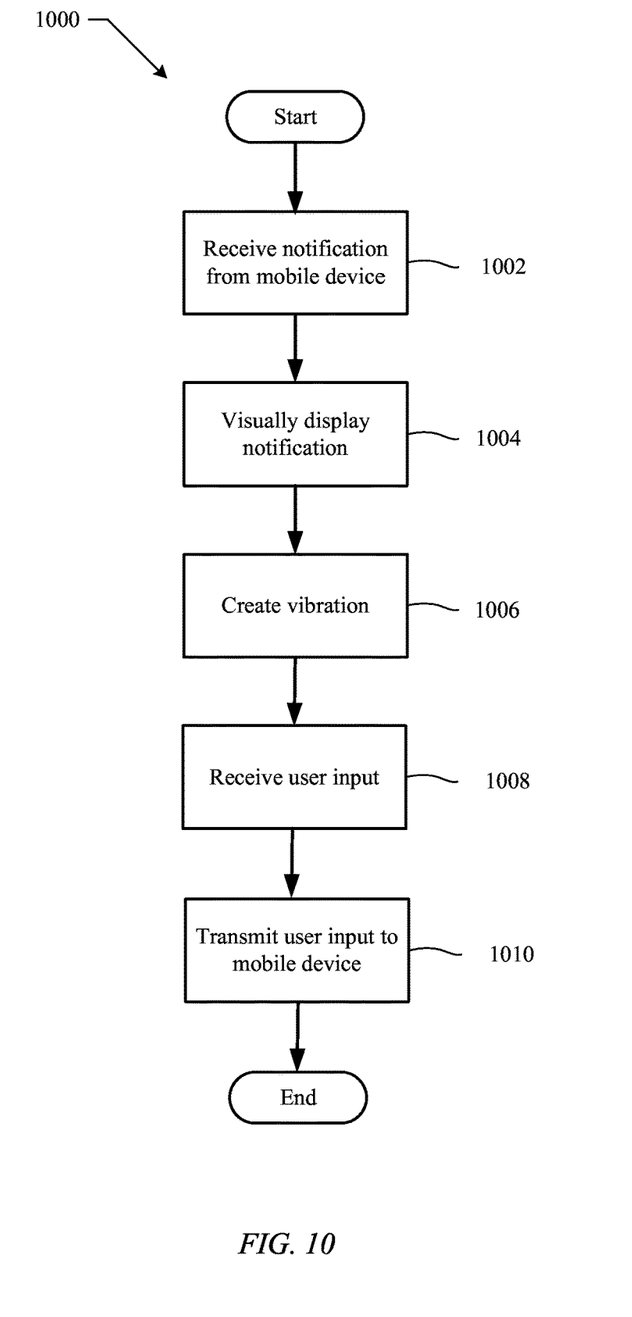
FIG. 10 shows a flowchart describing a sample process for implementing notifications on an accessory.

FIG. 10 shows a sample process 1000, demonstrating a method capable of receipt of notifications on a suitable accessory. In step 1002, a notification accessory can wirelessly receive a notification from a mobile device. In step 1004, the notification accessory can visually display the notification. In step 1006, the notification accessory can create a haptic to alert a user to the presence of the notification. In step 1008, the notification device may receive an input from the user. The input can be received using a touch screen, buttons, or any other feasible means of inputting information. Finally, in step 1010, the user input can be wirelessly transmitted to the mobile device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A notification accessory, comprising:
    a flexible housing configured to secure the notification accessory to a user;
    a communication circuit configured to wirelessly receive information from a mobile device; and
    an alerting mechanism included in the flexible housing, wherein:
    the alerting mechanism alerts the user when the wireless communication circuit receives a notification from the mobile device and provides the user with information related to a type of notification received, the alerting mechanism comprises:
        icons formed from micro-perforations in an exterior surface of the flexible housing to define a corresponding outline, the outline corresponding to the type of notification received; and
        an illumination source configured to project light through the micro-perforations of a respective icon to form an image corresponding to a received incoming notification.

2. The notification accessory as recited in claim 1, wherein the housing is in the form of a wristband capable of encircling a user's wrist.

3. The notification accessory as recited in claim 2, wherein the communication circuit uses a wireless connection to receive information from the mobile device.

4. The notification accessory as recited in claim 2, wherein the alerting mechanism further comprising a haptic device that alerts the user upon receipt of the received incoming notification.

5. The notification accessory as recited in claim 4, wherein the haptic device outputs different patterns depending on a source of the received incoming notification.

6. The notification accessory as recited in claim 5, further comprising:
    a connector located at a first end of the wristband; and
    a connector receptacle located at a second end of the wristband, wherein the wristband attaches to the user's wrist by inserting the connector into the connector receptacle.

7. The notification accessory as recited in claim 6, wherein the connector receptacle is configured to mate with a power cord for charging a battery housed within the notification accessory.

8. The notification accessory as recited in claim 7, wherein the connector is configured to mate with the mobile device, allowing the notification accessory and the mobile device to charge simultaneously.

9. The notification accessory as recited in claim 1, wherein the illumination source produces a first color of light when a source of the received incoming notification is from a first group of contacts and a second color of light when the source of the received incoming notification is form a second group of contacts.

10. The notification accessory as recited in claim 1, wherein the illumination source is disposed in the flexible housing beneath the micro-perforations.

11. The notification accessory as recited in claim 1, comprising multiple illumination sources, wherein each icon receives light from a single one of the illumination sources.

12. A system for receiving notifications from a mobile device and sending commands to the mobile device, the system comprising:
    a flexible wristband configured to be worn around a user's wrist;
    a processor;
    a wireless transmitter and receiver;
    a display disposed on an external surface of the flexible wristband, wherein the display is configured to show notifications received from the mobile device to the user and flex as the flexible wristband flexes; and
    a user input mechanism disposed on the external surface of the flexible wristband, wherein:
    the user input mechanism allows the user to control the mobile device; and
    the display comprises:
        micro-perforations that form outlines in the external surface of the flexible wristband, the outlines corresponding to a type of notification received; and
        an illumination source configured to project light through the micro-perforations of a respective outline to form an image corresponding to a received incoming notification.

13. The system as recited in claim 12, wherein the user input mechanism comprises a touch screen.

14. The system as recited in claim 13, wherein the user input mechanism allows the user to send predefined messages to contacts in response to declined incoming calls.

15. The system as recited in claim 13, wherein:
    the user input mechanism includes microphones spaced evenly around the wristband;
    the microphones are configured to receive voice signals and transmit the voice signals to the mobile device; and
    the processor reduces an amount of ambient noise or room echo in an audio signal by focusing on sounds from one of the microphones determined to be pointed most directly toward a user's voice by analyzing sound recorded by the microphones.

16. The system as recited in claim 15, wherein the processor uses beam-forming algorithms to analyze the sound recorded by the microphones in determining which is pointed most directly toward the user's voice.

17. The system as recited in claim 13, wherein the touch screen allows the user to adjust a volume level for the mobile device by grasping and rotating the wristband.

* * * * *

UNITED STATES PATENT AND TRADEMARK OFFICE
CERTIFICATE OF CORRECTION

PATENT NO. : 10,412,208 B1
APPLICATION NO. : 14/291033
DATED : September 10, 2019
INVENTOR(S) : Jahan Christian Minoo et al.

Page 1 of 1

It is certified that error appears in the above-identified patent and that said Letters Patent is hereby corrected as shown below:

In the Claims

Column 10, Line 24, "form;" should read --from--.

Signed and Sealed this
Twelfth Day of November, 2019

Andrei Iancu
*Director of the United States Patent and Trademark Office*